US012736152B1

(12) United States Patent
Miller

(10) Patent No.: US 12,736,152 B1
(45) Date of Patent: Sep. 15, 2026

(54) INTEGRAL MISALIGNMENT UNIONS AND INTERCHANGEABLE FLOATING PROCESS CONNECTIONS FOR TUBULAR GAUGE GLASS VALVES

(71) Applicant: Kenco International, Inc., Tulsa, OK (US)

(72) Inventor: R. Darrell Miller, Sand Springs, OK (US)

(73) Assignee: Kenco International, Inc., Tulsa, OK (US)

( * ) Notice: Subject to any disclaimer, the term of this patent is extended or adjusted under 35 U.S.C. 154(b) by 517 days.

(21) Appl. No.: 17/975,843

(22) Filed: Oct. 28, 2022

(51) Int. Cl.
*F16K 37/00* (2006.01)
*F16K 27/02* (2006.01)
*G01F 23/02* (2006.01)

(52) U.S. Cl.
CPC ...... *F16K 37/0058* (2013.01); *F16K 27/0245* (2013.01); *G01F 23/02* (2013.01)

(58) Field of Classification Search
CPC ... G01F 23/02; F16K 37/0058; F16K 27/0245
See application file for complete search history.

(56) References Cited

U.S. PATENT DOCUMENTS 2,912,218 A * 11/1959 Stillwagon ............ F16K 31/602 D23/244
3,717,323 A * 2/1973 Geipel .................. F16K 5/0626 251/315.13
4,098,119 A * 7/1978 Coats ...................... G01F 23/02 73/323
4,693,117 A 9/1987 Mills
5,442,959 A 8/1995 Mills
6,857,315 B1 2/2005 Mills et al.
10,161,778 B2 * 12/2018 Wilson .................... G01F 23/02
10,288,278 B2 * 5/2019 Nelson .................... F22B 37/78
11,112,292 B2 * 9/2021 Breeden .................. G01F 23/02
2005/0229974 A1 * 10/2005 Tschanz .................. G01F 23/02 137/386
2019/0331517 A1 * 10/2019 Breeden .................. G01F 23/02

* cited by examiner

*Primary Examiner* — Jonathan M Dunlap

(74) *Attorney, Agent, or Firm* — Head, Johnson, Kachigian & Wilkinson, PC

(57) ABSTRACT

A set of tubular glass gauge valves comprising an upper valve assembly and a lower valve assembly. The upper valve assembly and the lower valve assembly may each comprise an integral sight tube union connection capable of connecting to a tubular sight/level gauge and an integral misalignment union with a floating process connection capable of mounting to a tank or vessel. The integral misalignment union connection may allow the valve body to be moved and rotated as required to make it easier to install or remove a sight tube or level gauge. The valves may be moved up or down to compensate for an error in the center-to-center distance between vessel connections or the length of a sight tube/level gauge, and may also be moved radially in any direction to accommodate vessel connections that are out of plumb or misaligned from side-to-side. The interchangeable floating process connections may be rotated as required to compensate for bolt hole orientation issues on flanged vessel connections. The valves may accept different sight tube diameters and level gauge types for better performance, visibility, and protection.

14 Claims, 8 Drawing Sheets

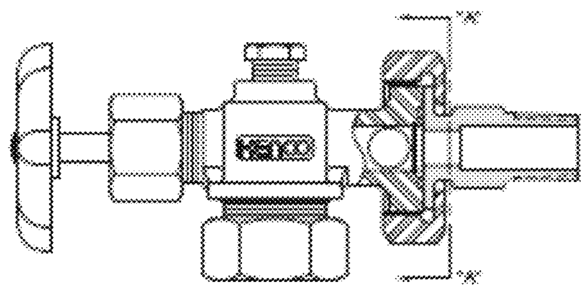
FIG. 6
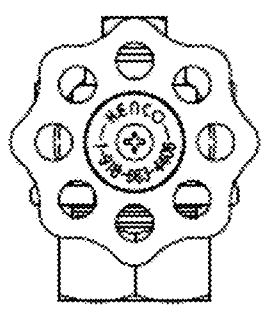
FIG. 7
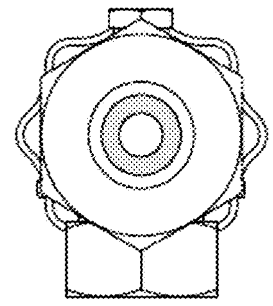
FIG. 8.1
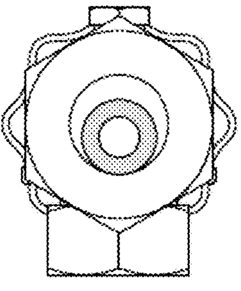
FIG. 8.2
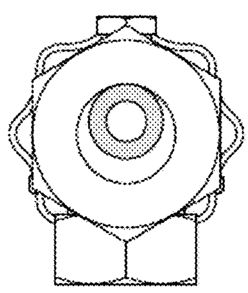
FIG. 8.3
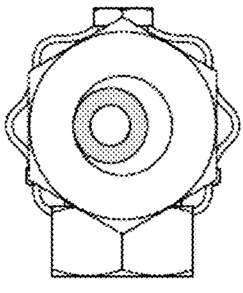
FIG. 8.4
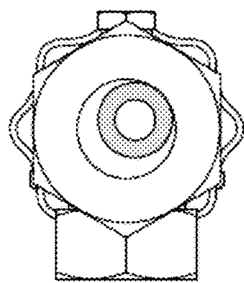
FIG. 8.5

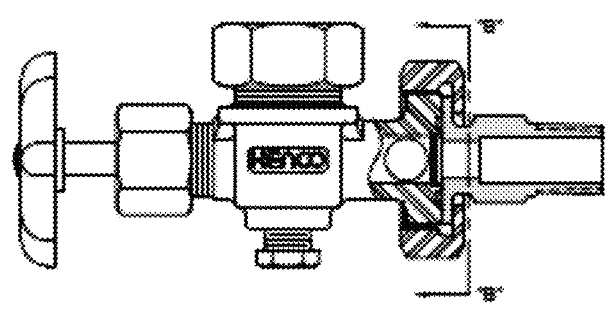
FIG. 9
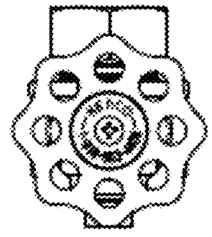
FIG. 10
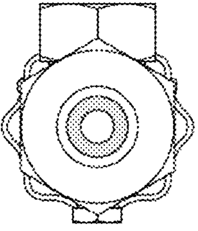
FIG. 11.1
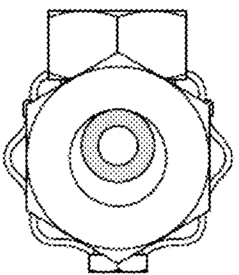
FIG. 11.2
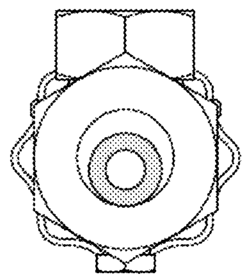
FIG. 11.3
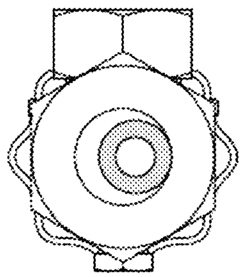
FIG. 11.4
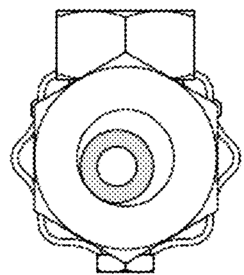
FIG. 11.5
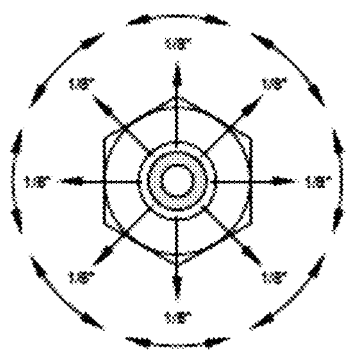
FIG. 12

INTEGRAL MISALIGNMENT UNIONS AND INTERCHANGEABLE FLOATING PROCESS CONNECTIONS FOR TUBULAR GAUGE GLASS VALVES

BACKGROUND OF THE INVENTION

Cross Reference

Not Applicable.

Field of the Invention

This invention relates generally to tubular gauge glass valves and more particularly, but not by way of limitation, to integral misalignment unions and interchangeable floating process connections for tubular gauge glass valves.

Description of the Related Art

It has long been a practice to use an elongated tubular member connected with fittings at each end to show the level of liquid in a containment vessel when attached thereto. This type of liquid level indication is commonly used because it is inexpensive and is fail proof since it does not depend on any mechanical or electrical mechanism to indicate liquid level.

One problem associated with the use of sight tubes for indicating liquid level is the danger of breakage. Any small diameter elongated tube of transparent material, whether glass or plastic, is susceptible of being broken by tools, broom handles, wind-blown objects, and so forth. If a sight tube is broken, spillage of liquid contents from the containment vessel can be a problem. The problem can be particularly serious if the contents are hazardous, such as combustible liquids.

Others have provided protective sight gauges. A particularly relevant reference is U.S. Pat. No. 4,693,117 issued on Sep. 15, 1987 entitled "Replacement Element For A Liquid Level Gauge Sight Tube". This patent shows a sight tube arrangement having upper and lower tubular portions that can be expeditiously received in compression type fittings secured to a vessel. This patent teaches a tubular gauge having a metallic shield member surrounding three sides of the sight tube and a transparent window closing the front of the shield. This type of liquid level sight gauge has proven very effective in providing increased safety since the sight tube is protected from inadvertent breakage. However, the system of U.S. Pat. No. 4,693,117 has the disadvantage in that tubular gauge has to be connected to additional components on each end to enable it to be connected to the containment vessel.

A large percentage of applications for liquid level gauges in process industries are low to medium pressure applications of less than 500 psig. These sight gauges use a clear sight tube for easy viewing of the liquid level. The materials of the clear sight tube are either glass or a transparent type of plastic, such as polycarbonate. Mechanical gauges are commonly installed onto tanks (a.k.a. "containment vessels") using several different methods:

1. In-line level gauge installed between a tubular valve at either end. The gauge and tubular valves are separate entities. The gauge is fabricated to fit between the customer supplied centerline distance between the tubular valves.
2. Gauge with 90° connections for threading directly into tank. No valves of any sort (for control of inventory) are included in this configuration.
3. The third method combines a level gauge and tubular valves into one construction. The valves on either end have a ball check shutoff to isolate gauge and containment vessel if an unequalized pressure condition exists (such as when sight tube breakage occurs). The offset valve design allows easy access to the sight tube for cleaning, removal, or routine maintenance.

U.S. Pat. No. 6,857,315 ("the '315 Patent"), which is incorporated herein by reference, advanced the art and resolved longstanding problems associated with all of the above constructions. The following further elaborates upon problems common to gauges of the contemporary art.

1. Gauge is built with incorrect centerlines. In the design stage, the systems designer will specify a centerline dimension for the level gauge. In actual fabrication of the containment vessel, the vessel fabricator, for several different reasons, may not be able to hold the centerline dimension desired. Expensive rework and labor will add cost and aggravation to completing the containment vessel/level gauge assembly.
2. Additional fittings are required. In many cases, several additional fittings, such as unions and valves, must be mated together to complete the assembly.
3. Leak Points. There are several leak points in the installations listed above. There is the potential for a leak between the gauge and whatever control valve is installed. Unions might be required to connect the gauge to the tank. All of these additional connections add cost and labor to the gauge and vessel assembly process.
4. Safety. In many configurations, the sight tube component of the level gauge is exposed to environmental elements. If sight tube breakage occurs, there is the potential for operator injury and exposure to chemical and/or a chemical spill.

The gauge of the '315 Patent advanced the art disclosed and claimed in the background material by disclosing an armored liquid level gauge with integral valves, ball check shutoffs, and misalignment union vessel connections. The invention's innovative misalignment union structure provides for a gauge assembly that accommodates up to ¼" of misalignment between the level gauge and containment vessel centerline connections.

Although misalignment unions had previously been available, such unions had never been incorporated into an armored level gauge assembly with integral valves and ball check shutoffs. Consequently, unions and other fittings normally required of a piping configuration into the containment vessel are now an integral part of the level gauge via the teachings of the '315 Patent. This lowered the total cost of the level gauge and containment vessel assembly and minimized the number of potential leak points associated with the additional fittings required with other types of level gauges.

Despite these advancements, further improvements are desirable. In particular, it is desirable to provide a tubular sight tube gauge with two valve structures that each combine a union connection for the sight tube and a combined union/process connection for mounting with a tank/vessel. It is further desirable for the process connection sizes and styles to be interchangeable. These improvements may provide users on a limited budget with a more cost-effective level gauge package with the potential for more options.

SUMMARY OF THE INVENTION

In general, in a first aspect, the invention relates to a set of tubular glass gauge valves comprising an upper valve assembly and a lower valve assembly. The upper valve assembly and the lower valve assembly may each comprise an integral sight tube union connection capable of connecting to a tubular sight/level gauge and an integral misalignment union for a floating process connection capable of mounting to a tank or vessel. The floating process connection may be a threaded process connection, a flanged process connection, a sanitary-type ferrule process connection, or a plain-end pipe process connection. The process connection sizes and styles may be interchangeable.

The integral sight tube union connection may be capable of allowing different sight tube diameters, level gauge configurations, and the ability to rotate the tubular sight/level gauge at various angles. The integral misalignment union for the floating process connection may have a seal and the upper valve assembly and lower valve assembly may each be capable of being moved and/or rotated during installation and removal of the tubular sight/level gauge without compromising the seal on the process connection. Furthermore, the upper valve assembly and the lower valve assembly may each be capable of being moved up or down to compensate for an error in a center-to-center distance between vessel connections or the length of the tubular sight/level gauge. The floating process connections may be capable of allowing a user to radially move and/or rotate the upper valve assembly and/or the lower valve assembly as required to achieve proper alignment between the upper and lower valve assemblies after the process connections have been connected to the tank or vessel.

The upper valve assembly and the lower valve assembly may each comprise: a valve stem; valve stem packing; a retainer washer for the valve stem packing; a valve stem packing nut; a valve stem handwheel; a handwheel mounting screw; an O-ring seal for the tubular sight/level gauge; a compression washer for the O-ring seal for the tubular sight/level gauge; a packing nut for the O-ring seal for the tubular sight/level gauge; a pipe plug for a vent and drain connection; a check ball; a retainer ring for the check ball; an O-ring seal for the floating process connection; a misalignment union nut; and a floating process connection.

BRIEF DESCRIPTION OF THE DRAWINGS

FIG. 6 is a side partial-cutaway view of the upper valve assembly,

FIG. 7 is a front view of the upper valve assembly;

FIGS. 8.1 through 8.5 are sectional views of the upper valve assembly taken along line A-A showing the floating process connection moved radially in different directions;

FIG. 9 is a side partial-cutaway view of the lower valve assembly;

FIG. 10 is a front view of the lower valve assembly;

FIGS. 11.1 through 11.5 are sectional views of the lower valve assembly taken along line B-B showing the floating process connection moved radially in different directions;

FIG. 12 is an illustrative view of the floating process connection, showing that the floating process connection can rotate and move radially in any direction;

FIGS. 15.1 through 15.3 are back views of the flanged process connections showing that the flanged process connections can rotate and move radially in any direction;

Figure 1:
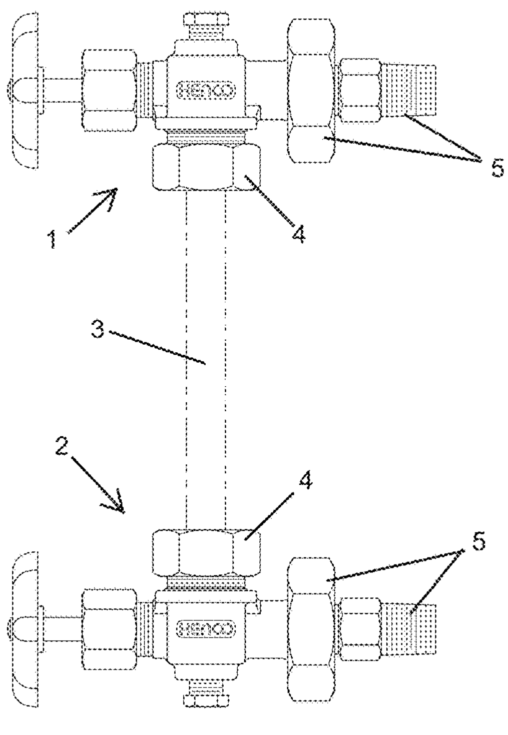
FIG. 1 is a side view of the tubular gauge glass valves with integral misalignment unions and floating MNPT threaded process connections.

Other advantages and features will be apparent from the following description and from the claims.

DETAILED DESCRIPTION OF THE INVENTION

The devices and methods discussed herein are merely illustrative of specific manners in which to make and use this invention and are not to be interpreted as limiting in scope.

While the devices and methods have been described with a certain degree of particularity, it is to be noted that many modifications may be made in the details of the construction and the arrangement of the devices and components without departing from the spirit and scope of this disclosure. It is understood that the devices and methods are not limited to the embodiments set forth herein for purposes of exemplification.

In general, in a first aspect, the invention relates to a tubular sight tube gauge with two valve structures that each combine a union connection for the sight tube and a combined union/process connection for mounting with a tank/vessel. The floating process connection sizes and styles may be interchangeable. The floating process connection may be threaded, flanged, sanitary-type ferrule, or plain-end pipe process elements. The tank-side union/process connection may be similar to the connection shown in U.S. Pat. No. 6,857,315. The valves of the present invention are unique because they include misalignment unions, interchangeable floating process connections, and union sight tube connections for various sight tube diameters and level gauge configurations.

The tubular sight gauge of the present invention may be similar to the tubular gauge for a liquid vessel shown in U.S. Pat. No. 6,857,315, but differs in that only a pair of valves are utilized in the assembly. This may provide users on a limited budget with a more cost-effective level gauge package with the potential for more options. The novel features of the present invention are the integral misalignment unions with interchangeable floating process connections. The misalignment unions may compensate for variations in vessel connection locations as well as flange bolt hole orientation, and may allow the user to move and/or rotate the valve body during sight tube/level gauge installation and removal without compromising the seal on the process connection.

The integral misalignment union connection may allow the valve body to be moved and/or rotated as required to make it easier to install or remove a sight tube or level gauge during installation and maintenance. Valves may be moved up or down to compensate for an error in the center-to-center distance between vessel connections or the length of a sight tube or level gauge. The user may not have to worry about the orientation of the valve body when trying to make a tight and leak-free joint between male pipe thread type process connections and the vessel as with valves having a rigid process connection. The integral union-type process connections may allow the user to radially move and/or rotate the valve bodies as required to achieve proper alignment between upper and lower valves after the process connections have been installed. The valve bodies may not have to be assembled to the process connections during the installation of the process connections to the vessel. This may further allow adjustments to be made to ensure that the upper and lower valve sight tube connections are in perfect alignment after installation. Additionally, the floating process connections may be rotated as required to compensate for bolt hole orientation issues on flanged vessel connections. They may compensate for 360° of radial (parallel offset) misalignment and may be moved up to ⅛" off the centerline of each valve body in any direction. For example, this process connection misalignment capability may allow the vertical center-to-center distance between the vessel connections or the length of the sight tube/level gauge to be off as much as +¼". They may also accommodate vessel connections that are out of plumb or misaligned from side-to-side.

The integral misalignment union connection may allow the tubular sight/level gauge to be installed into the integral sight tube union connections before the valve bodies are connected to the floating process connections mounted to the tank or vessel.

The union-type connection may allow different sizes and types of process connections to be retrofitted or changed out without having to purchase a complete new set of valves. To change the size of the valve process connection from ½" male pipe threads to ¾" male pipe threads, the user may simply remove the ½" male threaded process connection from each valve and replace them with ¾" male process connections. If the vessel connections are changed from male pipe threads to pipe flanges, the process connections on the valves may be easily changed by removing the valve union nuts and male pipe threaded process connections and replacing them with flanged process connections. This type of interchangeability may allow the valves to have multiple process connection style options such as male pipe threads, pipe flanges, sanitary-type ferrules, plain-end pipes, etc.

The integral misalignment union connection may minimize leak points and may have an O-ring face seal with a variety of material options to accommodate most any chemical compatibility requirement. O-ring seals are readily available and may be easily removed and replaced whenever service is needed. The integral sight tube union connection on the valves of the present invention, also with an O-ring seal, may allow easy removal of the sight tube or level gauge without the need of removing the valves from the vessel.

The valves may also have options for various sight tube diameters. Having a larger sight tube diameter option may be important for applications where viscous liquids may be present. They may accept different types of sight gauge options, such as the shielded tubular sight gauge of U.S. Pat. No. 5,442,959, which may provide a wider range) (360° of visibility, or the replacement element for a liquid level gauge sight tube of U.S. Pat. No. 4,693,117, which may allow the metal sight tube enclosure to be rotated at various angles for enhanced visibility.

Figure 2:
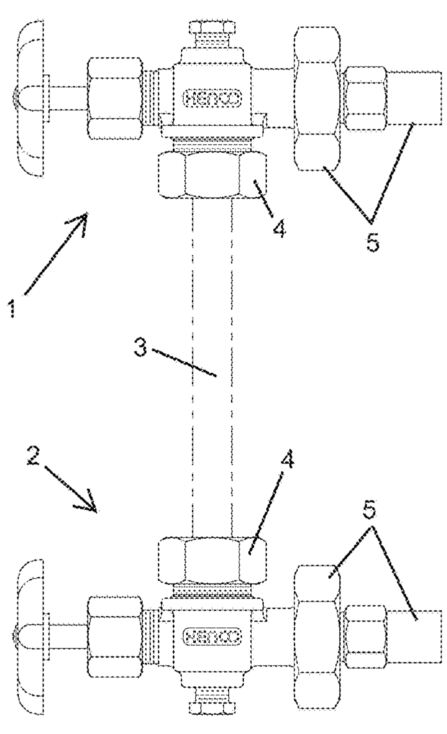
FIG. 2 is a side view of the tubular gauge glass valves with integral misalignment unions and floating plain-end pipe process connections.
Figure 3:
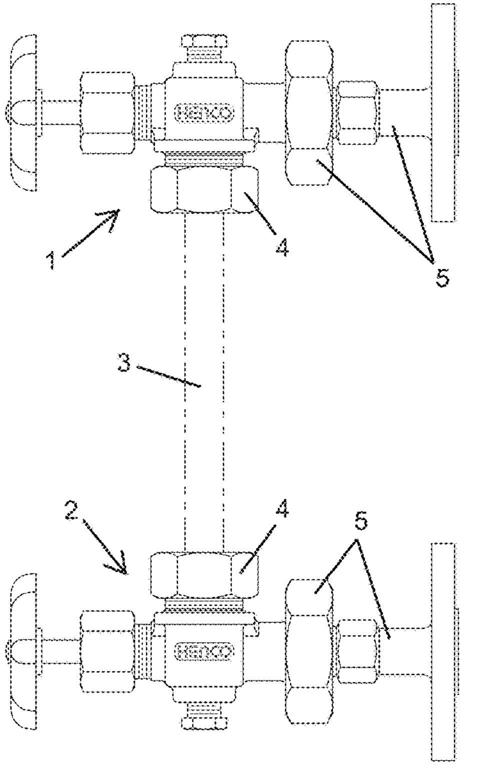
FIG. 3 is a side view of the tubular gauge glass valves with integral misalignment unions and floating flanged process connections.
Figure 4:
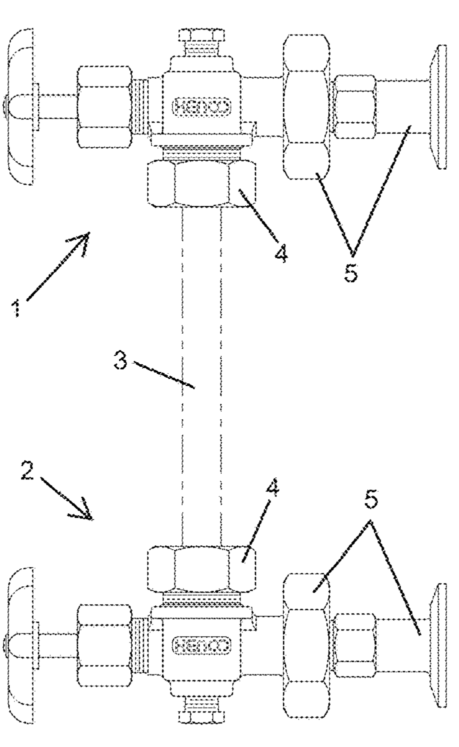
FIG. 4 is a side view of the tubular gauge glass valves with integral misalignment unions and floating sanitary-type ferrule process connections.

As seen in the drawings, the invention may comprise an upper valve assembly 1 and a lower valve assembly 2, which may connect and support a tubular sight/level gauge 3 and mount the tubular sight/level gauge 3 to a tank or vessel (not shown). The valve assemblies 1 and 2 may each combine a sight tube union connection 4 for the tubular sight/level gauge 3 and a combined union/process connection 5 for mounting with a tank or vessel. FIG. 1 shows the tubular gauge glass valves 1 and 2 with integral misalignment unions and floating MNPT threaded process connections 5. FIG. 2 shows the tubular gauge glass valves 1 and 2 with integral misalignment unions and floating plain-end pipe process connections 5. FIG. 3 shows the tubular gauge glass valves 1 and 2 with integral misalignment unions and floating flanged process connections 5. FIG. 4 shows the tubular gauge glass valves 1 and 2 with integral misalignment unions and floating sanitary-type ferrule process connections 5.

Figure 5:
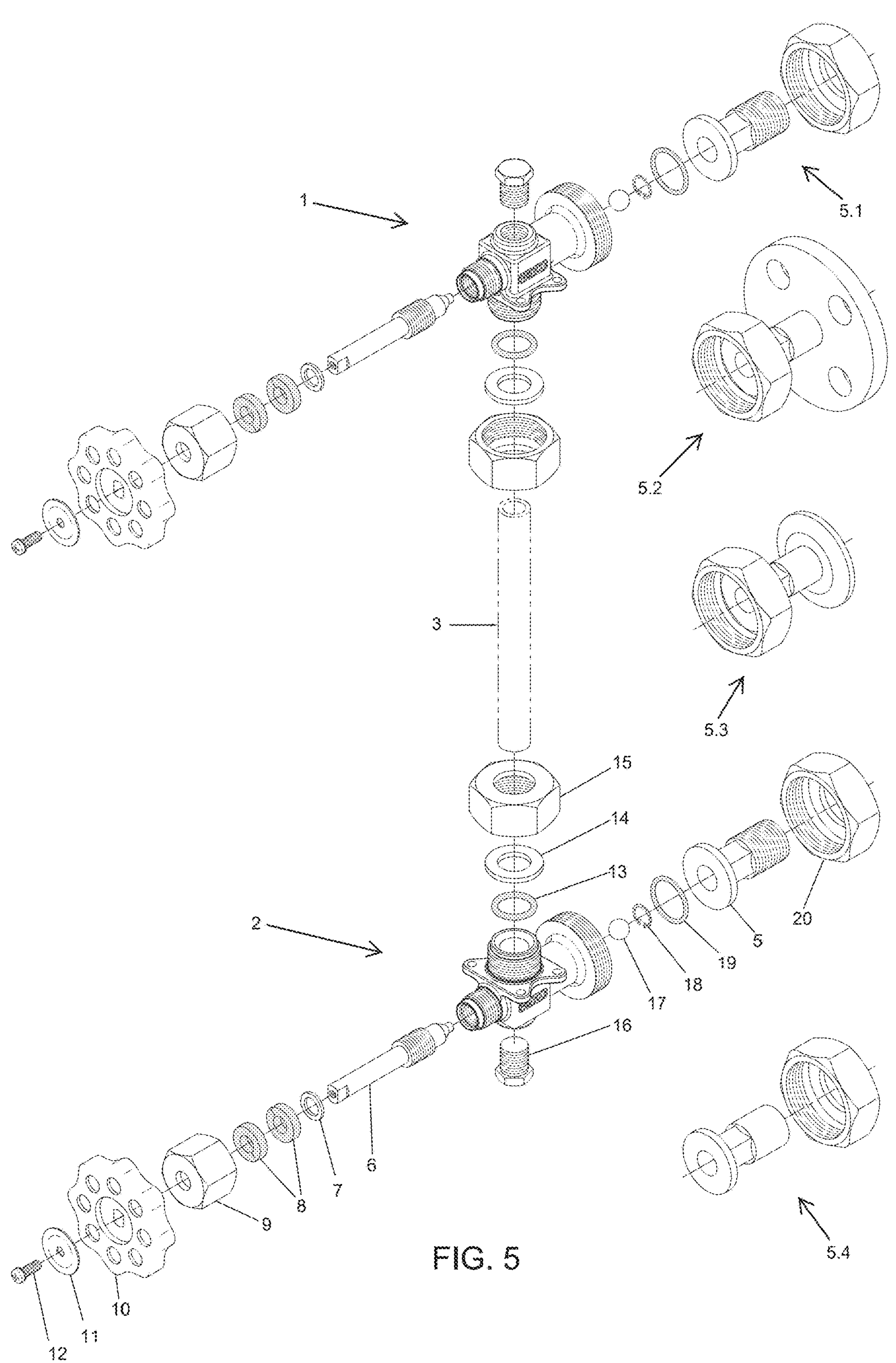
FIG. 5 is an exploded perspective view of the tubular gauge glass valves.

FIG. 5 is an exploded perspective view of the tubular gauge glass valves 1 and 2. Specifically, FIG. 5 shows the upper valve assembly 1; the lower valve assembly 2; valve stem 6; retainer washer 7 for the valve stem packing 8; valve stem packing 8; valve stem packing nut 9; valve stem handwheel 10; identification plate 11; handwheel mounting screw 12; O-ring seal 13 for the sight tube 3; compression washer 14 for the sight tube O-ring seal 13; packing nut 15 for the sight tube O-ring seal 13; pipe plug 16 for the vent and drain connection; check ball 17; retainer ring 18 for the check ball 17; O-ring seal 19 for the floating process connection 5; floating process connection 5; and misalignment union nut 20. Please note that elements 5 through 20 are labeled with respect to the lower valve assembly 2, but are also shown with respect to the upper valve assembly 1. FIG. 5 also shows a variety of optional floating process connection 5 types, including MNPT threaded process connection 5.1; optional flanged process connection 5.2; optional sanitary-type ferrule process connection 5.3; and optional plain-end pipe process connection 5.4. In dashed lines, FIGS. 1 through 5 show a tubular sight tube or level gauge 3, which may not be included with the valves 1 and 2, but which may be necessary for viewing the liquid level inside the vessel to which the valves 1 and 2 are mounted.

FIG. 6 is a side partial-cutaway view of the upper valve assembly 1, FIG. 7 is a front view of the upper valve assembly 1, and FIGS. 8.1 through 8.5 are sectional views of the upper valve assembly 1 taken along line A-A showing the floating process connection 5 moved radially in different directions. Similarly, FIG. 9 is a side partial-cutaway view of the lower valve assembly 2, FIG. 10 is a front view of the lower valve assembly 2, and FIGS. 11.1 through 11.5 are sectional views of the lower valve assembly 2 taken along line B-B showing the floating process connection 5 moved radially in different directions. FIG. 12 is an illustrative view of the floating process connection 5, showing that the floating process connection 5 can rotate and move radially in any direction.

Figures 13, 14:
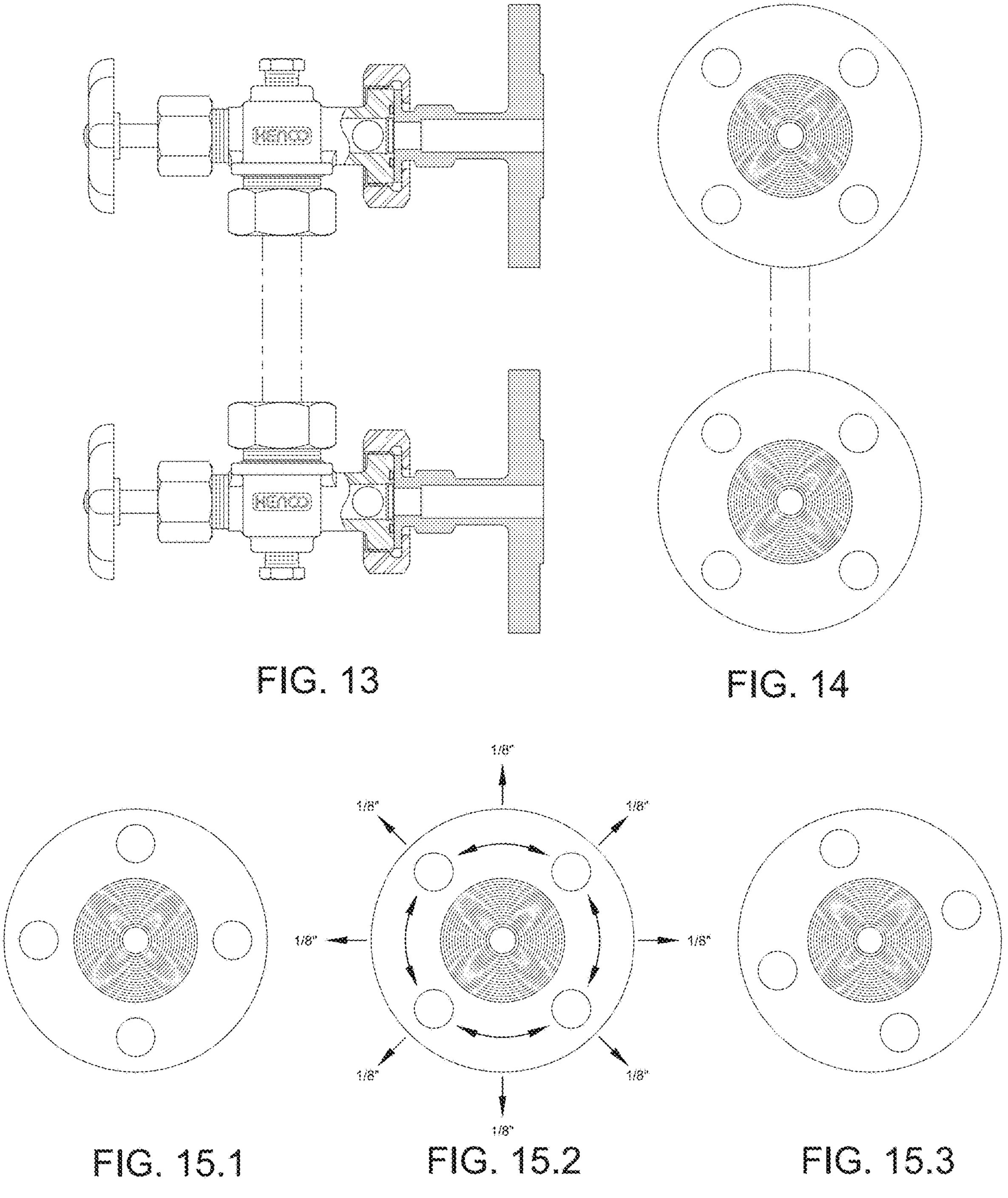
FIG. 13 is a side partial-cutaway view of the tubular gauge glass valves with flanged process connections.
FIG. 14 is a back view of the tubular gauge glass valves with flanged process connections.

FIG. 13 is a side partial-cutaway view of the tubular gauge glass valves 1 and 2 with flanged process connections 5, while FIG. 14 is a back view of the tubular gauge glass valves 1 and 2 with flanged process connections 5. FIGS. 15.1 through 15.3 are back views of the flanged process connections 5 showing that the flanged process connections 5 can rotate and move radially in any direction.

Figure 16:
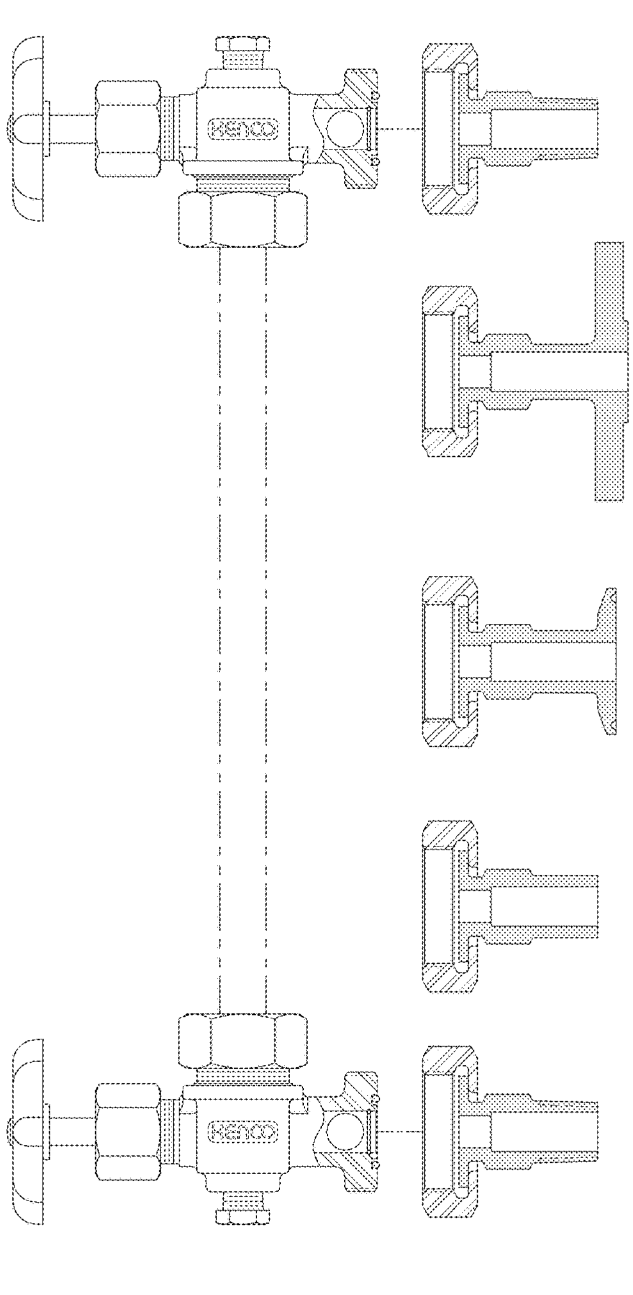
FIG. 16 is a side partial-cutaway view of the tubular gauge glass valves showing that floating process connections can be installed to the vessel before connecting the valve bodies to the process connection union nuts to help ensure that the sight tube connections are properly aligned.
Figure 17:
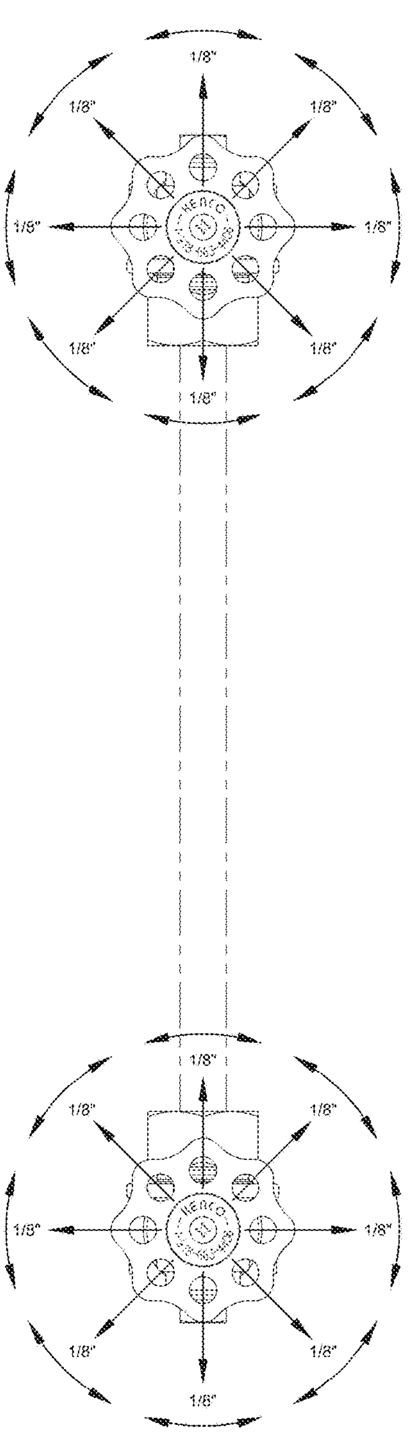
FIG. 17 is a front view of the tubular gauge glass valves showing that the floating process connections allow the valve bodies to rotate and move radially in any direction.

FIG. 16 is a side partial-cutaway view of the tubular gauge glass valves 1 and 2 showing that process connections 5 can be installed to the vessel before connecting the valve bodies 1 and 2 to the process connection union nuts 20 to help ensure that the sight tube connections are plumb and properly aligned. FIG. 17 is a front view of the tubular gauge glass valves 1 and 2 showing that the floating process connections 5 allow the valve bodies 1 and 2 to rotate and move radially in any direction.

Figures 18, 19:
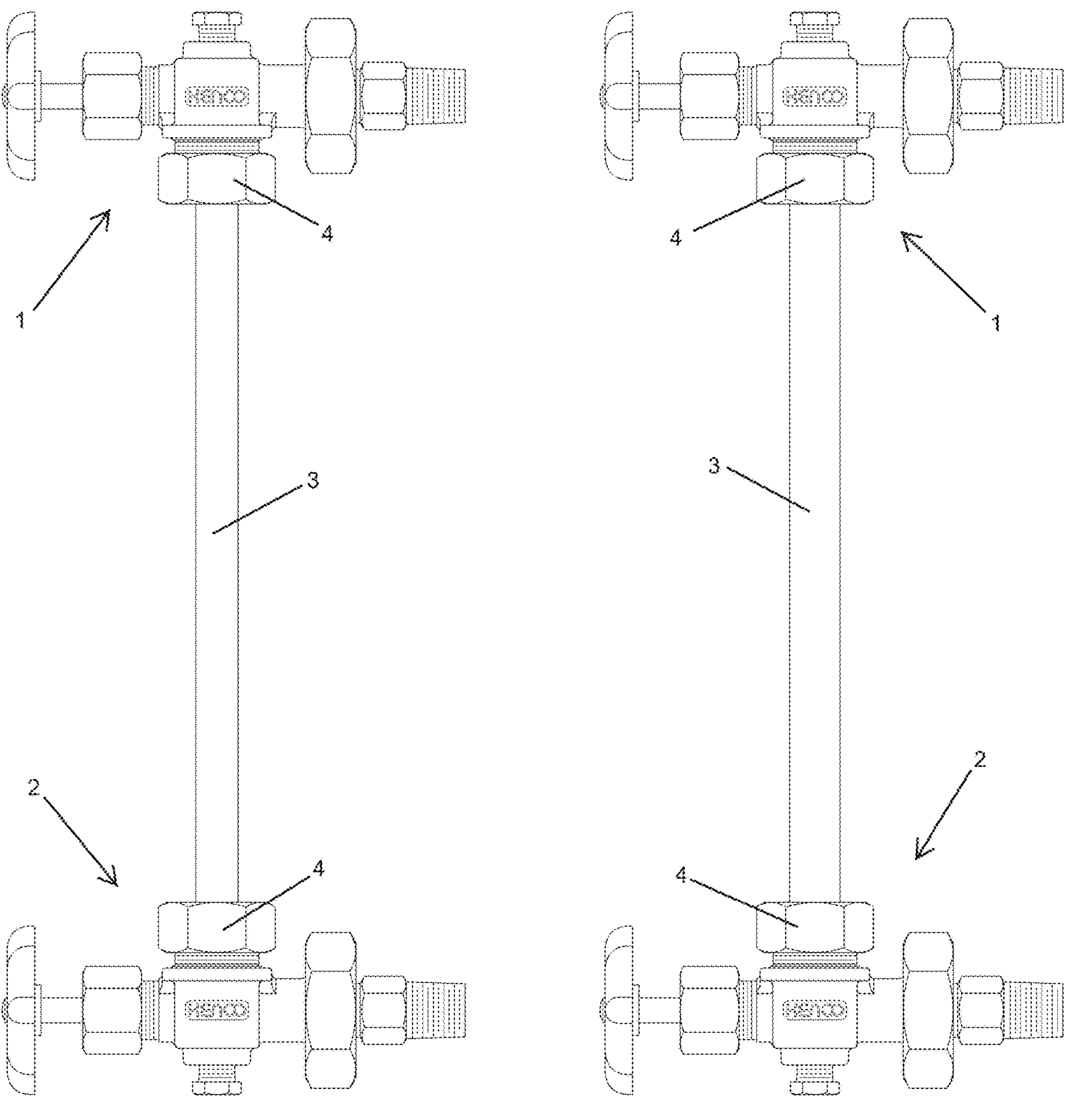
FIG. 18 is a side view of the tubular gauge glass valves with a sight tube with a first diameter installed into the gauge glass connections.
FIG. 19 is a side view of the tubular gauge glass valves with a sight tube with a second, different diameter installed into the gauge glass connections.

FIG. 18 is a side view of the tubular gauge glass valves 1 and 2 with a sight tube 3 with a first diameter installed into the sight tube union connections 4, while FIG. 19 is a side view of the tubular gauge glass valves 1 and 2 with a sight tube 3 with a second, different diameter installed into the sight tube union connections 4. This illustrates that valves 1 and 2 may accept sight tubes 3 with different diameters.

Figures 20, 21:
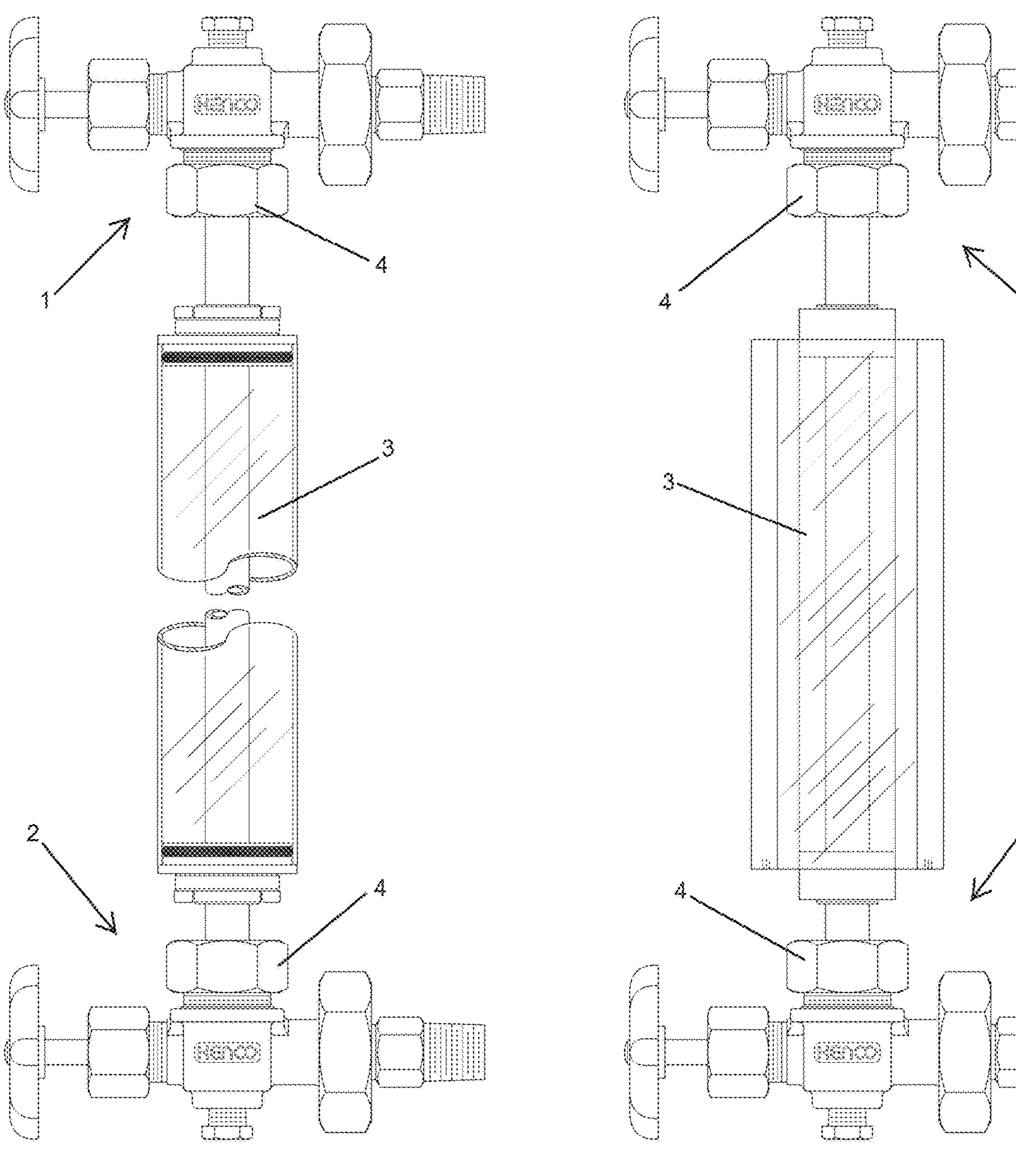
FIG. 20 is a side view of the tubular gauge glass valves with a level gauge as described in U.S. Pat. No. 5,442,959 installed into the gauge glass connections.
FIG. 21 is a side view of the tubular gauge glass valves with a level gauge as described in U.S. Pat. No. 4,693,117 installed into the gauge glass connections.

FIG. 20 is a side view of the tubular gauge glass valves 1 and 2 with a level gauge 3 as described in U.S. Pat. No. 5,442,959 installed into the sight tube union connections 4 and FIG. 21 is a side view of the tubular gauge glass valves 1 and 2 with a level gauge 3 as described in U.S. Pat. No. 4,693,117 installed into the sight tube union connections 4. The sight tube union connection 4 may allow the level gauge 3 to be rotated 360°.

In summary, the novel features of the present invention are the integral misalignment unions with interchangeable floating process connections. The integral misalignment union connection may allow a valve body to be moved and rotated as required to make it easier to install or remove a sight tube or level gauge during installation and maintenance. Valves may be moved up or down to compensate for an error in the center-to-center distance between vessel connections or the length of a sight tube/level gauge. They may also be moved radially in any direction to accommodate vessel connections that are out of plumb or misaligned from side-to-side. The interchangeable floating process connections may be rotated as required to compensate for bolt hole orientation issues on flanged vessel connections. The valves may accept different sight tube diameters and level gauge types for better performance, visibility, and protection.

Whereas, the devices and methods have been described in relation to the drawings and claims, it should be understood that other and further modifications, apart from those shown or suggested herein, may be made within the spirit and scope of this invention.

What is claimed is:

1. A set of tubular glass gauge valves for viewing a liquid level inside a vessel, the set comprising:

a vessel;

an upper valve assembly; and a lower valve assembly;

where the upper valve assembly and the lower valve assembly each comprise:

an integral sight tube union connection connected to a tubular sight/level gauge; and an integral misalignment union and a floating process connection mounted on the vessel;

wherein the process connection sizes are interchangeable and the upper valve assembly and the lower valve assembly are capable of being adjusted off of center and/or rotated independent of one another while mounted on the vessel.

2. The set of tubular glass gauge valves of claim 1 where the integral sight tube union connection is capable of allowing the tubular sight/level gauge to be rotated at various angles while mounted on the vessel.

3. The set of tubular glass gauge valves of claim 1 where the integral sight tube union connection is capable of allowing the tubular sight/level gauge to be installed or removed without removing tubular gauge glass valves from the vessel.

4. The set of tubular glass gauge valves of claim 1 where the integral sight tube union connection is capable of allowing the tubular sight/level gauge to be installed into valve bodies before the valve bodies are connected to the floating process connections mounted to the vessel.

5. The set of tubular glass gauge valves of claim 1 where the process connection is a threaded process connection, a flanged process connection, sanitary-type ferrule process connection, or plain-end pipe process connection.

6. The set of tubular glass gauge valves of claim 1 where the process connection styles are interchangeable.

7. The set of tubular glass gauge valves of claim 1 where the process connection has a seal and where the upper valve assembly and lower valve assembly are each capable of being moved and/or rotated during installation and removal of the tubular sight/level gauge without compromising the seal on the process connection.

8. The set of tubular glass gauge valves of claim 1 where the process connections are capable of allowing the upper valve assembly and the lower valve assembly to be connected to the process connections after the process connections have been mounted to the vessel.

9. The set of tubular glass gauge valves of claim 1 where the upper valve assembly and the lower valve assembly are each capable of being moved up or down to compensate for an error in a center-to-center distance between vessel connections or the length of the tubular sight/level gauge.

10. The set of tubular glass gauge valves of claim 1 where the upper valve assembly and the lower valve assembly are each capable of being radially moved in any direction as required to achieve proper alignment between the upper and lower valve assemblies.

11. The set of tubular glass gauge valves of claim 1 where the upper valve assembly and the lower valve assembly are each capable of being connected to the floating process connections after the floating process connections have been mounted to the vessel.

12. The set of tubular glass gauge valves of claim 1 where the process connections are capable of allowing a user to rotate the upper valve assembly and/or the lower valve assembly as required to achieve proper alignment between the upper and lower valve assemblies after the process connections have been connected to the vessel.

13. The set of tubular glass gauge valves of claim 1 where the process connections are capable of allowing a user to radially move the upper valve assembly and/or the lower valve assembly in any direction as required to achieve proper alignment between the upper and lower valve assemblies after the process connections have been connected to the vessel.

14. The set of tubular glass gauge valves of claim 1 where the upper valve assembly and the lower valve assembly each comprise:

a valve stem;

valve stem packing;

a retainer washer for the valve stem packing;

a valve stem packing nut;

a valve stem handwheel;

a handwheel mounting screw;

an O-ring seal for the tubular sight/level gauge;

a compression washer for the O-ring seal for the tubular sight/level gauge;

a packing nut for the O-ring seal for the tubular sight/level gauge;

a pipe plug for a vent and drain connection;

a check ball;

a retainer ring for the check ball;

an O-ring seal for the floating process connection;

a misalignment union nut; and a floating process connection.

* * * * *